June 19, 1962 M. W. BEARDSLEY 3,039,550
AIRBORNE SURFACE VEHICLE
Filed May 2, 1960

INVENTOR
MELVILLE W. BEARDSLEY
BY A. Fred Starobin
ATTORNEY

United States Patent Office 3,039,550
Patented June 19, 1962

3,039,550
AIRBORNE SURFACE VEHICLE
Melville W. Beardsley, Severna Park, Md., assignor to National Research Associates, Inc., Laurel, Md., a corporation of Maryland
Filed May 2, 1960, Ser. No. 26,165
6 Claims. (Cl. 180—7)

The present invention relates to surface vehicles, and has particular reference to an improved form of a plenum chamber vehicle.

Perhaps the outstanding advantage of the invention lies in the achievement of a simple, effective lifting system which can be used to support vehicles over a ground surface without physical contact.

With the new design arrangement it is possible to achieve the performance of a peripheral jet vehicle with the simplicity, reduced structural weight, and reduced cost inherent in a plenum chamber vehicle.

Accordingly, the present invention is directed to achieve increased lift and height above a ground surface for a plenum chamber type of lifting device.

Basically, the present invention provides a novel and improved means to confine pressure in a chamber which has one side open to, but not in physical contact with, a flat surface.

Wherever a surface or ground surface is mentioned in the specification or claims it is not to be considered confined in any way to a surface over land since fluid surfaces such as water or other fluids denser than the fluid through which the vehicle is traveling will be equally capable of supporting a vehicle of the type in this invention.

The above and other objects and advantages of the invention will become apparent upon full consideration of the following detailed description and accompanying drawings, in which.

Figure 1:
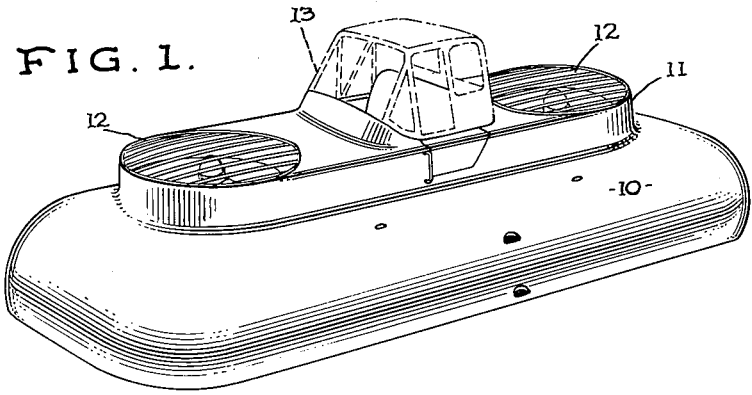
FIG. 1 is a perspective view showing the novel type of body shell of a vehicle of this invention.

Referring first to FIG. 1, there is illustrated a perspective view of a vehicle with body shell 10 having a configuration so as to create the air flow characteristics in accordance with the principles of this invention as explained below in connection with FIGS. 3 and 4. On top of body shell 10 is mounted superstructure 11 having gratings 12 in front and rear to allow an intake of air by air blowers located beneath the gratings 12. Centered on superstructure 11 are seating accommodations 13 with covering, if so desired, but not necessary to the invention.

Figure 2:
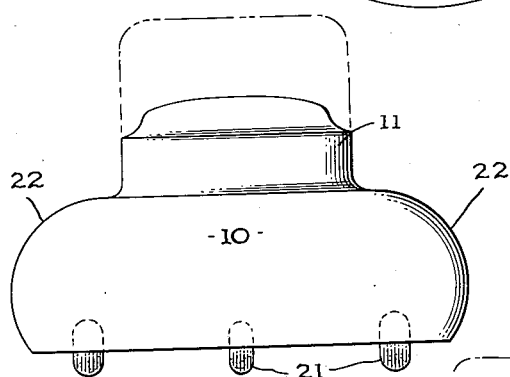
FIG. 2 is an end elevation view of the vehicle of FIG. 1.

The front and rear of the vehicle of FIG. 1 are symmetrical as are the sides, as illustrated by an elevation view in FIG. 2. This view can serve equally well as a front or rear elevation of the vehicle illustrated in FIG. 1. The symmetry of both body shell and superstructure 11 are thereby shown. Wheels 21 are merely for standing or towing purposes when no power is applied in the vehicle. The rounded sections 22 of body shell 10 are designed so as to direct the flow of air taken in through gratings 12 in a stream and such a manner so as to result in the great lifting power of this vehicle.

Figure 3:
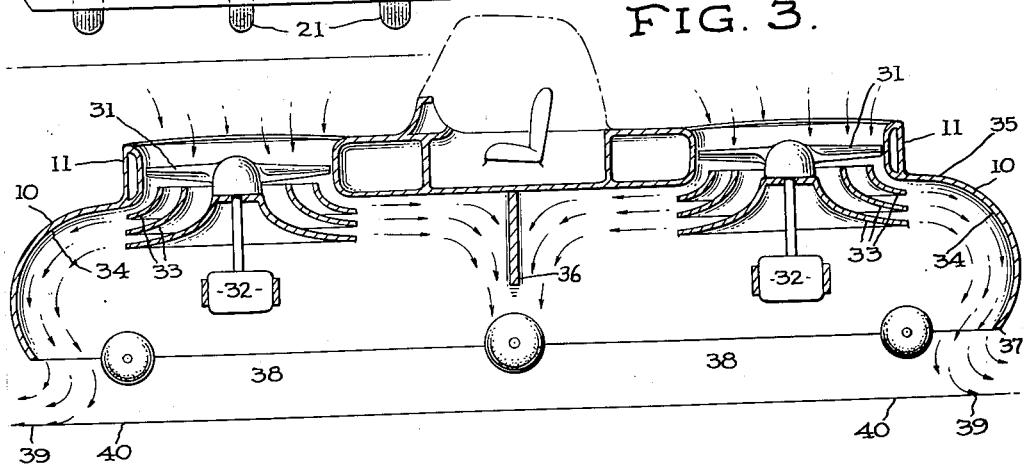
FIG. 3 is a cross-section of a vehicle incorporating the invention and illustrating the principles of operation.

FIG. 3 shows in a cross-section view the essential mechanism and air flow within the body shell 10. An air blower 31 of the axial flow type is driven by an engine 32. Blower 31 is mounted at the top of body shell 10 shrouded in superstructure 11 so that it blows air into the interior or plenum of the vehicle body shell 10. Directly beneath the axial-flow blower 31 is a series of circular turning vanes 33 which direct the air flow outward so that the stream of air emerges flowing parallel to and along inner surface 34 of body shell 10 as indicated by the arrows.

At point 35 the body shell 10 starts curving downward so that the outwardly flowing air is also forced to turn downward, conforming to the curvature of body shell 10. When the flow stream reaches bottom edge 37 of the body shell 10 it turns outward as shown by the arrows. The air flow takes this direction because the pressure in the plenum or air space 38 under the body shell 10 is greater than the atmospheric pressure which acts on the outer surface of the stream flow. The air flow curves outward from under body shell 10, as shown in FIG. 3, until at point 39 it becomes parallel to, and in contact with, the ground surface 40. A wall section 36 extending transversely across the plenum chamber shell 10 also directs the air flow from the blowers 31 downward toward ground plane 40 and has a stabilizing influence on the vehicle which can be controlled by control of individual blowers 31.

Although blowers 31 are illustrated as axial-flow type blowers in FIG. 3 that is not to be considered as limiting the type of blower which can be used. As a means of causing an air flow into the plenum, a radial-flow, centrifugal type, or a mixed flow blower being partially axial and partially radial could just as well be used as could any means that pumps air into the body shell.

Nor is the number of blowers limited. The novel form of craft may use just one blower or any number in accordance with the power desired.

Figure 5:
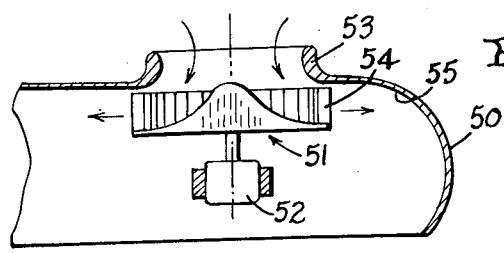
FIG. 5 is a cross-section view of a portion of a vehicle illustrating another embodiment of the vehicle of this invention.

As an example, FIG. 5 illustrates in a cross-section view a radial air blower 51 within body shell 50 driven by an engine 52. The blower of this type is mounted below the shrouded structure 53 within the shell 50. Air flow is drawn in through shrouded structure 53 and redirected by impeller blades 54 so as to travel parallel to and along inner surface 55 of shell 50 as indicated by arrows. Air flow is then the same as described in connection with FIG. 3.

Figure 4:
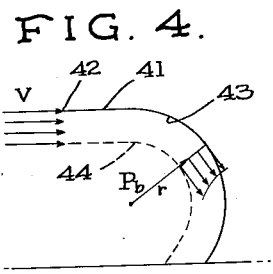
FIG. 4 is a diagram showing the air flow characteristics created by the novel shape of the vehicle.

The general characteristics of the air flow as it is turned following the inside surface 34 of body shell 10 are indicated in FIG. 4. The flow outwardly along the top flat portion 41 of plenum body shell 10 is essentially uniform in velocity as indicated by the velocity V profile at section 42. As the flow continues outward over the curved inner surface 43 in shell 10 it maintains uniform angular momentum from its inner surface of the air flow, as indicated by the dashed line 44, out to the plenum shell surface 43. Thus, with the angular velocity constant across the stream of air flow, the velocity V, along the outer flow stream lines indicated by arrows adjacent to the plenum shell surface 43 is lower than the velocity of the inner flow stream lines indicated by arrows nearer the dashed line 44. In accordance with Bernoulli's principle, the pressure on the curved portion of the inner shell surface 43 is greater than the static pressure Pb existing in the plenum inside the flow sheet formed by the air flow from the blowers.

In my experiments I have found that a fluid flow directed into a plenum along and parallel to the inner surface of a shell will follow along the inner surface, without scattering, turning with it as indicated in FIGS. 3 and 4, providing the curvature of the shell surface is not too sharp. For typical proportions of the blower and body shell of vehicles of this type, my experiments have indicated that the radius of curvature of the shell surface should be greater than the thickness, or height, of the air flow sheet discharged into the plenum from the blower alone or in conjunction with turning vanes 33.

Also, in my experiments, I have found that the shell curvature may be continued beyond the vertical so that the flow is discharged from the bottom edge with an inward component. This inward component of velocity makes it possible to attain greater height above the ground plane underneath the plenum shell. This has been taken into account in the shaping of the plenum body shells, as shown in the figures.

In the operation of the novel craft of this invention, a jet sheet of substantially uniform thickness is discharged around the inner bottom edge 37 of the body shell 10. In this manner, vehicles incorporating the essentials of this invention achieve the height-lift-power characteristics of peripheral jet vehicles which are superior to the characteristics of the other plenum chamber vehicles which do not have the characteristics of the vehicle of this invention, since their height attained is determined by the area required for horizontal discharge of air out of the pressurized plenum. At the same time this invention also achieves the advantages of the fundamental simplicity characteristics of plenum chamber vehicles, since no complex ducting is required to control and direct the air flow from the blower to the point of discharge.

It should be understood that the specific apparatus shown and described herein is intended to be representative only. From the foregoing, varied application of the novel aspects of the invention will occur to those skilled in the art, and variations in matters of detail will be apparent; and therefore it is appropriate that the appended claims be accorded a latitude of interpretation, consistent with the spirit and scope of the invention.

What is claimed is:

1. A vehicle able to support itself above a surface by fluid pressure comprising
    a plenum shell open toward the surface and having a bent portion with a lower portion bent inwardly
    a fluid flow pump located to discharge fluid into said shell,
    and means for directing fluid flow in the form of a sheet of fluid including a surface of constantly changing slope for changing the direction of fluid flow from a first direction at the intake of said shell to a direction following the contour of said shell,
    said bent portion of said plenum shell having a minimum effective radius of curvature exceeding the thickness of the sheet of fluid determined by the effluent edge of said surface of changing slope and said shell,
    and said bending inwardly lower portion discharging the sheet of fluid inwardly and downwardly.

2. The vehicle of claim 1, further characterized by said lower portion extending inward for a distance less than the distance equal to the minimum effective radius of curvature of said bent portion of said plenum shell.

3. A vehicle able to support itself above a surface by fluid pressure comprising
    a plenum shell open toward the surface and having a bent portion with a lower portion bent inwardly,
    a fluid flow pump located to discharge fluid into said shell,
    and a plurality of concave upwardly curved annular deflector plates in stacked position in the path of fluid discharge from said fluid flow pump whereby fluid is directed in the form of a sheet of fluid adjacent to said shell with a minimum amount of fluid turbulence,
    said bent portion of said plenum shell having a minimum effective radius of curvature exceeding the thickness of the sheet of fluid determined by the effluent edge of the lowest positioned of said plates and said shell,
    and said lower portion discharging the sheet of fluid inwardly and downwardly.

4. A vehicle able to support itself above a surface by fluid pressure comprising
    a plenum shell open toward the surface and having an inwardly bent lower portion,
    a fluid flow pump located to discharge fluid into said shell,
    at least one concave upwardly deflector plate in the path of fluid discharge from said fluid flow pump,
    said plenum shell having a minimum height of its inner surface above the bottom edge of said inwardly bent lower portion exceeding the thickness of the sheet of fluid determined by the effluent edge of said deflector plate and said shell,
    and said plenum shell lower portion bending inwardly to discharge the sheet of fluid inwardly and downwardly.

5. A vehicle able to support itself above a surface by fluid pressure comprising
    a plenum shell open toward the surface and having a bent portion with a lower portion bent inwardly,
    an inlet means in the upper portion of said shell to allow the passage of fluid into said shell,
    a fluid flow pump located at said inlet means in a position to discharge fluid into said shell in the form of a sheet,
    and means including a surface of constantly changing slope for directing fluid flow in the form of a sheet of fluid and changing the direction of fluid flow from a first direction at the intake of said shell to a direction following the contour of said shell,
    said bent portion of said plenum shell having a minimum effective radius of curvature exceeding the thickness of the sheet of fluid determined by the effluent edge of said surface of constantly changing slope and said shell,
    said inlet means having an effective radius of its passage through which the fluid enters said shell substantially equal to twice the thickness of the sheet of fluid following the contour of said shell in the vicinity of the pump,
    and said bent portion of said plenum shell lower portion discharging the sheet of fluid inwardly and downwardly.

6. A vehicle able to support itself above a surface by fluid pressure comprising
    a plenum shell open toward the surface and having a bent portion with a lower portion bent inwardly,
    said plenum shell having an opening at the top portion including a shrouded portion,
    a radial flow blower located within said shrouded portion and disposed coaxially of the opening to receive fluid through the opening and in a position to move the fluid in a flow in the form of a sheet adjacent to and parallel to said shell,
    said bent portion of said plenum shell having a minimum effective radius of curvature exceeding the thickness of the sheet of fluid emitted from said radial flow blower in the vicinity of said blower, and said lower portion discharging the sheet of fluid inwardly and downwardly.

References Cited in the file of this patent

UNITED STATES PATENTS

| | | |
|---|---|---|
| 1,123,589 | Porter | Jan. 5, 1915 |
| 2,014,051 | Nishi | Sept. 10, 1935 |
| 2,814,064 | Montgomery | Nov. 26, 1957 |
| 2,838,257 | Wibault | June 10, 1958 |
| 2,955,780 | Hulbert | Oct. 11, 1960 |

FOREIGN PATENTS

| | | |
|---|---|---|
| 219,133 | Australia | Nov. 24, 1928 |

OTHER REFERENCES

Publication: "Basic Principles of Ground Cushion Devices" presented at the SAE Annular Meeting, Jan. 11–15, 1960. Page 21 of particular interest.

Publication: "Symposium on Ground Effect Phenomena," presented at Princeton University, Oct. 21–23, 1959; pages 149, 260, 364 and 368 relied on.